United States Patent [19]
Erickson et al.

[11] 3,722,839
[45] Mar. 27, 1973

[54] VAPOR-LIQUID CONTACTING

[75] Inventors: Alve J. Erickson, Chisholm, Minn.; Thomas W. Mix, Wellesley, Mass.

[73] Assignee: Merix Corporation, Wellesley, Mass.

[22] Filed: July 20, 1970

[21] Appl. No.: 56,266

[52] U.S. Cl. ............261/111, 55/229, 55/233, 55/238, 55/240, 55/257, 55/347, 55/348, 55/416, 55/452, 55/457, 261/112, 261/114 R, 261/118, 261/DIG. 54
[51] Int. Cl. ..................B01d 47/06, B01d 47/10
[58] Field of Search......261/114, 79 A, 112, 94, 106, 261/98, 118, 90, 111, DIG. 54; 55/347, 348, 457, 346, 447, 229, 233, 238, 240, 257, 416, 452; 138/39, 37

[56] References Cited

UNITED STATES PATENTS

| | | | |
|---|---|---|---|
| 1,983,762 | 12/1934 | Kotzebue | 261/79 AX |
| 2,201,301 | 5/1940 | Richardson | 55/347 X |
| 2,226,128 | 12/1940 | Harmon | 55/348 X |
| 2,493,017 | 1/1950 | Nutter | 261/118 UX |
| 2,569,909 | 10/1951 | Umney | 55/347 X |
| 2,668,620 | 2/1954 | Fontein | 55/346 X |
| 2,863,318 | 12/1958 | Schroder | 138/37 X |
| 2,903,224 | 9/1959 | Gooding | 261/106 X |
| 2,936,043 | 5/1960 | Armstrong et al. | 55/457 X |
| 3,076,480 | 2/1963 | Vicard | 138/39 |
| 3,227,429 | 1/1966 | Renzi | 261/112 |
| 3,251,176 | 5/1966 | Gleason | 55/457 X |
| 3,278,169 | 10/1966 | Mitchell | 261/114 X |
| 3,353,799 | 11/1967 | Lions et al. | 261/112 X |
| 3,399,870 | 9/1968 | Zuiderweg et al. | 261/114 X |
| 3,502,596 | 3/1970 | Sowards | 261/94 X |
| 3,548,568 | 12/1970 | Carlson, Jr. et al. | 261/90 X |
| 3,590,560 | 7/1971 | Pall | 55/457 |

FOREIGN PATENTS OR APPLICATIONS

| | | | |
|---|---|---|---|
| 706,291 | 3/1965 | Canada | 261/98 |
| 901,290 | 7/1962 | Great Britain | 55/447 |

Primary Examiner—Dennis E. Talbert, Jr.
Attorney—R. W. Furlong

[57] ABSTRACT

Vapor-liquid contacting device having a contact zone, a separator downstream of the contact zone, and a fluid conduit extending transversely through the interior of the contact zone and having a wall providing openings spaced transversely in the zone for distributing fluid thereinto.

15 Claims, 6 Drawing Figures

Patented March 27, 1973 3,722,839
2 Sheets-Sheet 2
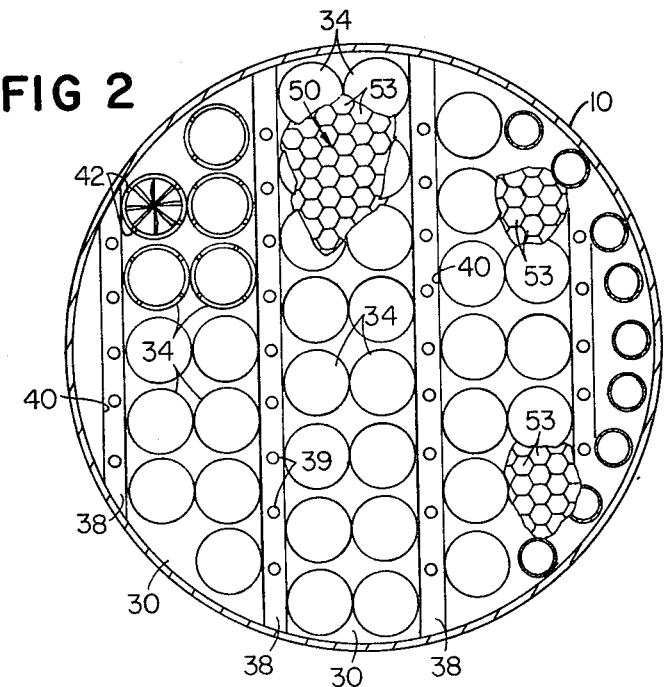
FIG 2
FIG 6
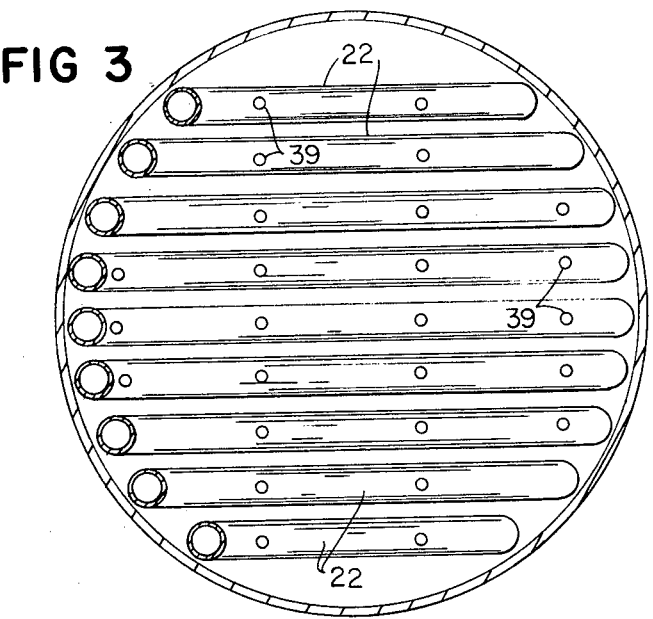
FIG 3
FIG 4
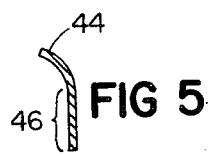
FIG 5

VAPOR-LIQUID CONTACTING

This invention relates to vapor-liquid contacting, e.g. in a fractional distillation column.

A primary object of the invention is to contact fluids more efficiently and more uniformly. Other objects are to provide, in a column-like device, high mass flows relative to column diameter; to reduce column height requirements for a contactor stage, and to reduce column volume requirements for a given separation, thus reducing the costs of the shell and the foundation associated with the housing; all in a simple and reliable contacting device characterized by low entrainment, low tendency to flood, low tendency to weep, low holdup, low pressure drop relative to mass flows, low residence time, and good turndown capability. In another aspect it is an object of the invention to improve vapor-liquid separation downstream of any contacting device.

In general the invention features, in one aspect, a device having a contact zone, a separator downstream of the contact zone, and a fluid conduit extending transversely through the interior of the contact zone and having a wall providing openings spaced transversely in the zone for distributing fluid thereinto. In other aspects the invention features a contact zone feeding a plurality of separators; and a contact zone through which fluid flow is axial upstream of a separator at which the axially flowing fluid is caused to swirl. In yet another aspect the invention features a separator of the centrifugal type employing vanes to rotate the entering fluid, each vane being aerodynamically shaped with an axial upstream portion parallel to the general direction of fluid flow through the separator, narrow effluent slots preferably being provided in the separator wall, and a flow restriction preferably being provided in the separator downstream of the slots to increase the pressure differential across the slots. In preferred embodiments longitudinally spaced contactor stages are arranged in a column up through which vapor and liquid flow cocurrently; a series of parallel perforated liquid distribution pipes extend across each contact zone transverse to the general direction of flow through the zone, the pipes preferably sloping from the horizontal only enough to maintain the same rate of liquid flow through all liquid distribution holes in the conduit; the pipes help to suppress general swirling as the flow enters the contact zone, and, by defining narrow flow passages, provide a high velocity vapor region, improving entrainment and preventing weeping; the separators are free of walls extending continuously through the contact zone to adjacent the pipes, so that wall discontinuity will facilitate turbulence to improve contacting; a multiplicity of tubular separators are supported above the pipes in communication with the contact zone to receive liquid and vapor therefrom, each separator having a plurality of narrow longitudinal slots and being pinched down at its downstream end to provide the flow restriction and additionally to accelerate the internal vapor flow, thereby to entrain vapor outside the separator having passed through the slots, reducing the pressure outside the slots and further increasing the pressure drop thereacross; the outlet slots in the separators total typically 10 percent or less of the area of the separator wall above the turning vanes; pipes of successive stages are connected through downcomers; collectors are provided outside wall-to-wall contacting separators above the contact zone to collect liquid effluent from the separator slots and return the liquid to the feed conduits for re-contacting; the contact zone has a porous extended area medium (preferably honeycomb) just upstream of the separators, to receive liquid and vapor flowing rapidly (F number (the product of superficial gas velocity and the square root of gas density) of at least 4 ft./sec.[lb./ft.$^3$]$^{1/2}$), whereby the medium spreads the liquid to provide large interfacial contact area and hence greater mass transfer; and flow straighteners are provided downstream of the separators to convert into pressure rotational energy of vapor leaving the separators to enter the contact zone of the next stage.

Other objects, features, and advantages will appear from the following description of a preferred embodiment of the invention taken together with the attached drawings, in which:

FIG. 2 is a sectional view through 2—2 of FIG. 1;

FIG. 3 is a sectional view through 3—3 of FIG. 1;

FIG. 4 is a vertical sectional view of a separator;

FIG. 5 is an enlarged scale sectional view through 5—5 of FIG. 4; and

FIG. 6 is a sectional view along 6—6 of FIG. 1

Figure 1:
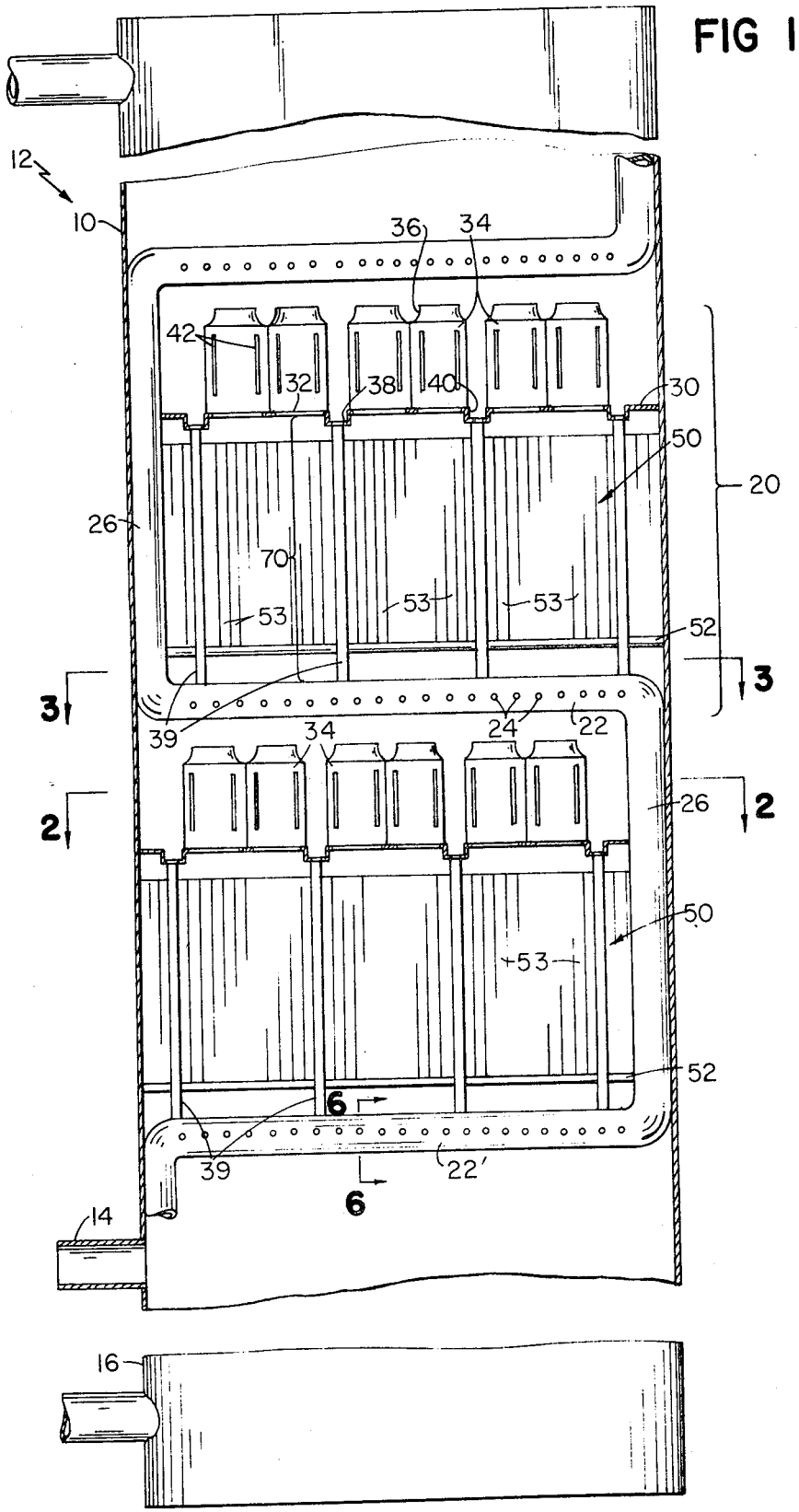
FIG. 1 is a vertical sectional view, broken away, of a contacting-separating device showing two full stages.

Referring to the drawings, cylindrical housing 10 of liquid-vapor contacting and separating column 12 has a central vapor inlet 14 and, below its bottom stage, a reboiler 16. A series of "plates" or stages is vertically arranged inside housing 10. Considering intermediate stage 20 as typical, 1 inch diameter, equally spaced, parallel pipes 22 extend across housing 10, sloping slightly from the horizontal to counteract the hydraulic gradient associated with flow of liquid from left to right as seen in FIG. 1, thereby to maintain the same rate of liquid flow through all distribution holes 24. Pipes 22 have aerodynamic cross-sections to minimize pressure drop in the flow past the pipes. Holes 24, 1/16 inch diameter, are arranged along the sides of pipes 22 on 3/16 inch centers. All but the longest pipe 22 is internally restricted to equalize liquid residence time in all pipes of a given stage. Each pipe 22 is connected to a downcomer pipe 26 adjacent wall 10, to carry liquid directly to a corresponding pipe 22' in the stage next below.

A tray 30 above pipes 22 has openings 32 beneath cylindrical separating tubes 34 (1.5 inches diameter, 4 inches long) having pinched down outlets 36 (outlet diameter 85 percent of inlet diameter). Troughs 38 (¼ inch wide) extend along one side of each row of separators, under slots 40 in tray 30. The separators are in contact with each other between adjacent troughs, but adjacent separators within the rows are spaced to allow drainage into the troughs. Pipes 39 connect the troughs to pipes 22 below. Each separator has two pairs of longitudinal liquid effluent slots 42 (3 inches long, 100 mils wide, the slots preferably representing typically 10 percent or less of the surface area of the separator above the turning blades), each pair having perpendicular axes symmetrical to and above its adjacent trough, just below pinched outlet 36. Slightly below slots 42 in each separator are mounted stationary aerodynamically shaped turning blades 44, with axial upstream portions 46 parallel to the general direction of vapor flow axially into the separator. Similarly, aerodynamically shaped straightening blades 48 are mounted near outlet 36.

Honeycomb packing 50 is supported on rods 52 spaced above pipes 22. The honeycomb is of thin metal (e.g., steel or aluminum, of the order of 2 mils thick), has of the order of 50 axial cells 53 per square inch of cross-section, extends axially a distance of about twice the height of the separators, and terminates just below the separators. Contact zone 70 thus has the major portion of its volume filled with the honeycomb, and includes an open portion just above pipes 22.

In operation, vapor to be processed is introduced under pressure through inlet 14 and, in general, rises between pipes 22 and through separators 34 of successive stages, all at very high velocity (e.g., with an F number in the range of 4–20 ft./sec.[lb./ft.$^3$]$^{1/2}$). Condensed liquid flows down through pipes 22 and downcomers 26. At each stage liquid passes out through holes 24, and is broken up and atomized and quite uniformly distributed in the open portion of contact zone 70 between the pipes 22 and honeycomb 50. The dispersed liquid is intimately mixed and contacted with the vapor within zone 70, with resultant mass transfer between phases. Because of the arrangement of pipes 22 (which define narrow, elongated flow passages between themselves) and separators 34 the flow through the contact zone has only very local swirling components, and so is primarily axial when the liquid is introduced from pipes 22, greatly improving operation. In addition, pipes 22, by restricting flow area, produce a high velocity vapor region, improving entrainment and preventing weeping. On the other hand, a desirable (for good contacting) high degree of turbulence (without general swirling) in the contact zone is ensured by the lack of any continuous wall surface extending from a separator to adjacent pipes 22 (e.g., note the discontinuity between the walls of pipes 22 and those of separators 34, and the intervening presence of honeycomb 50). Furthermore, the spacing of liquid outlets 24 throughout the contact zone gives excellent liquid distribution.

The uniform intimate nature of the mixture makes possible very effective use of packing for effecting additional mass transfer. Particular merits of honeycomb include prevention of channeling and prevention of the development of non-uniform distribution often associated with packing in countercurrent or cocurrent contactors. Small cell size in the honeycomb is desirable for large interfacial contact area and so the liquid films are stretched into thin layers. The cell size should not be too small so that slug flow of liquid is produced up the cells with its associated lower rates of mass transfer. The honeycomb walls should preferably be of a material wet by the liquid.

As the liquid and vapor enter separators 34 blades 44 cause a general spinning of the fluid which causes the heavier liquid to flow along the separator walls and out slots 42 into troughs 38, while the now separated vapor flows through straightening blades 48 (where rotational energy is reconverted to pressure) and outlets 36. The restriction and gas acceleration effected by the pinching of outlets 36 increases the pressure drop across slots 42, to facilitate liquid exit and aid entrainment in the main vapor stream of any small amounts of vapor escaping through slots 42. As the vapor begins to interact with the next stage of pipes 22 its flow is again turbulently axial, and the contacting process is repeated. Meanwhile, liquid in troughs 38 is carried through pipes 39 to feed pipes 22 for recontacting.

Other embodiments (e.g., with annular liquid collection troughs around each separator; or purely counter-current flow with a separate set of perforated feed pipes for each separator even inside the separator, so that there are no feed pipes that supply liquid to more than one separator; or combined cross flow and counter-current flow; or with large diameter imperforate liquid cross-flow pipes connected through vertical pipes to smaller perforated feed pipes, so that no significant cross-flow occurs in the small perforated pipes, to further reduce hydraulic gradient; etc.) will occur to those skilled in the art and are within the following claims.

What is claimed is:

1. Vapor-liquid contacting apparatus comprising a column housing in which a contacting and separating stage is arranged downstream of sources of vapor and liquid, said stage comprising
   a separator mounted within said housing and having
      a wall spaced from said housing, and
      a plurality of fluid outlets, at least one of said outlets being disposed in said wall to permit flow of liquid effluent transversely of said column housing,
   said separator and said sources being spaced along an axis to define a contact zone therebetween, and
   a plurality of liquid feed conduits each having a portion upstream of said separator extending in said contact zone generally parallel to each other and transverse to said axis and having a plurality of openings spaced in a direction transverse to said axis for distribution of liquid into said contact zone, a downcomer for supplying liquid to each said conduit from a stage downstream thereof, said generally parallel portions of said conduits being spaced from each other to define restricted flow passages for the vapor to produce a high vapor velocity region which prevents weeping.

2. The apparatus of claim 1 wherein said separator comprises a set of flow turning vanes mounted upstream of said fluid outlets and spaced radially inwardly of said wall but downstream of said liquid feed conduit, said vanes causing said fluid to swirl within said separator so that said liquid is thrown radially outwardly against said wall and through said outlet in said wall.

3. The apparatus of claim 2 wherein said vanes are shaped with upstream portions parallel to said axis and to said stream of fluid and gradually curving in a direction transverse to said axis.

4. The apparatus of claim 3 wherein the outlets in said wall of said separator include a plurality of restricted liquid outlet slots therethrough comprising in total no more than 10 percent of the surface area of said wall above said vanes.

5. The apparatus of claim 2 wherein flow straightening vanes are provided within said separator downstream of said outlet for liquid effluent in said wall.

6. The apparatus of claim 1 wherein a multiplicity of tubular separators is provided in said stage, each said separator having liquid outlet slots in its said wall adjacent collector troughs running between rows of said separators.

7. The apparatus of claim 1 further comprising a porous extended area medium in said contact zone to spread said liquid and hence increase interfacial contact area.

8. The apparatus of claim 7 wherein said medium is a honeycomb.

9. The apparatus of claim 8 wherein said honeycomb has axial cells, occupies the major portion of said contact zone, but is spaced from said conduit to provide an open portion of said contact zone.

10. The apparatus of claim 9 wherein there are of the order of 50 said cells per square inch.

11. Vapor-liquid contacting apparatus comprising a column housing in which a contacting and separating stage is arranged downstream of sources of vapor and liquid, said stage comprising a plurality of separators mounted within said housing and each having a tubular wall spaced from said housing arranged parallel to the stream from said sources, an axial downstream fluid outlet and a plurality of fluid outlets in said wall to permit flow of liquid effluent transversely of said column housing, said separators and said sources of fluid being spaced along said axis to define a contact zone therebetween, said zone communicating with a plurality of said separators, and a plurality of liquid feed conduits each having a portion upstream of said separator extending in said contact zone generally parallel to each other and transverse to said axis and having a plurality of openings spaced in a direction transverse to said axis for distribution of liquid into said contact zone, a downcomer for supplying liquid to each said conduit from a stage downstream thereof, said generally parallel portions of said conduits being spaced from each other to define restricted flow passages for the vapor to produce a high vapor velocity region which prevents weeping.

12. A vapor-liquid separator comprising a tubular housing having an axial inlet, an axial outlet, a plurality of peripheral outlets through said housing intermediate said inlet and outlet, the total area of which is no more than 10 percent of the total surface area of said housing downstream of said vanes, and a set of radially arranged flow turning vanes at said inlet, each said vane having an axially extending upstream portion to receive axially flowing fluid and a gently curving downstream portion extending transversely of said axis.

13. The separator of claim 12 further comprising a flow restriction at said axial outlet.

14. The separator of claim 13 wherein said restriction comprises a pinched down portion of said housing.

15. The separator of claim 17 further comprising flow straightening vanes downstream of said turning vanes.

* * * * *